(12) United States Patent
Noda

(10) Patent No.: US 7,280,746 B2
(45) Date of Patent: Oct. 9, 2007

(54) OPTICAL DISC APPARATUS

(75) Inventor: Ryusuke Noda, Osaka (JP)

(73) Assignee: Funai Electric Co., Ltd., Daito-shi (JP)

( * ) Notice: Subject to any disclaimer, the term of this patent is extended or adjusted under 35 U.S.C. 154(b) by 880 days.

(21) Appl. No.: 10/717,606

(22) Filed: Nov. 21, 2003

(65) Prior Publication Data

US 2004/0101292 A1   May 27, 2004

(30) Foreign Application Priority Data

Nov. 21, 2002   (JP) .............................. 2002-338152

(51) Int. Cl.
*H04N 5/781* (2006.01)
(52) U.S. Cl. ...................... 386/125; 386/126; 386/124; 386/95
(58) Field of Classification Search ................ 386/125, 386/126, 124, 95
See application file for complete search history.

(56) References Cited

U.S. PATENT DOCUMENTS

2003/0043187 A1*  3/2003  Li ............................... 345/749

FOREIGN PATENT DOCUMENTS

| JP | 11-110957 | 4/1999 |
|---|---|---|
| JP | 11-297052 | 10/1999 |

* cited by examiner

*Primary Examiner*—Thai Q. Tran
*Assistant Examiner*—Helen Shibru
(74) *Attorney, Agent, or Firm*—Crowell & Moring LLP

(57) ABSTRACT

The main controller makes the designated non-volatile memory store the restart point equivalent to the preceding stop point, and in starting reproduction processing, the main controller reads out the restart point from the designated non-volatile memory and starts reproducing video images from the restart point.

Thus, the main controller can restart next reproduction from the preceding stop point, even when once a user takes out an optical disc from an optical disc apparatus, and loads the optical disc apparatus with the same optical disc again, or even when a user transfers the optical disc from one optical disc apparatus to another optical disc apparatus, whether or not the optical disc is rewritable.

7 Claims, 7 Drawing Sheets

MEMORY REFERENCE METHOD CHOICE MENU o PLEASE CHOOSE THE MEMORY REFERENCE METHOD.

1. UNCONDITIONAL REFERENCE TO DESIGNATED MEMORY
2. REFERENCE TO THE REPRODUCING PLAYER
3. CHOOSING BETWEEN 1 AND 2 EACH TIME

REFERRED PLAYER CHOICE MENU o PLEASE DESIGNATE THE DVD PLAYER WHOSE MEMORY IS REFERRED.

1. PLAYER 1a (LIVING ROOM)
2. PLAYER 1b (PRIVATE ROOM)
   · 
   · 
   ·

RESUME TABLE 14

| ID | RESTART POINT | |
|---|---|---|
| | RESTART TIME POINT | RESTART ADDRESS POINT |
| A | 00:10:00 | 040000h |
| A | 00:16:20 | 046333h |
| A | 00:18:15 | 048250h |
| B | 00:05:30 | 035000h |
| C | 01:00:45 | 090750h |
| ⋮ | ⋮ | ⋮ |

RESUME INFORMATION 71 points to row A 00:10:00 040000h; 72 points to ID column; 74 points to restart time column; 73 brackets the restart point columns; 75 points to row C.

FIG. 9
81
○ PLEASE CHOOSE THE RESTART POINT.
1. AFTER 10 MINUTES FROM THE BEGINNING
2. AFTER 16 MINUTES AND 20 SECONDS FROM THE BEGINNING
3. AFTER 18 MINUTES AND 15 SECONDS FROM THE BEGINNING
FIG. 10
82
○ PLEASE CHOOSE THE RESTART POINT.
1. 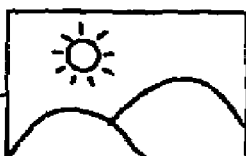   2. 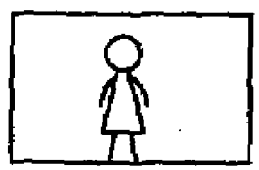
84
3. 

OPTICAL DISC APPARATUS

BACKGROUND OF THE INVENTION

1. Field of the Invention

The present invention relates to an optical disc apparatus for reading and reproducing data such as sounds or video images recorded on an optical disc such as a DVD (digital versatile disc).

2. Description of the Related Art

In the optical disc apparatus which reproduces data like sounds, video images, or characters recorded on an optical disc such as a CD (compact disc), LD (laser disc), DVD-ROM (digital versatile disc read only memory) or the like, a conventional optical disc apparatus with a resume function is known. The optical disc apparatus with a resume function restarts reproducing data such as video images continuously from the preceding stop point. The optical disc apparatus realize a resume function by storing the optical disc memory address which shows the preceding stop point, and restarting next reproduction from this address.

The conventional optical disc apparatus with a resume function, however, clears the information about the preceding stop point stored in a volatile memory, when once the optical disc has been taken out of the apparatus. Consequently, the apparatus cannot restart next reproduction from the preceding stop point, when once a user takes out the optical disc used for halfway reproduction from the apparatus, and loads the apparatus with the same optical disc again, or when a user transfers the optical disc used for halfway reproduction from one apparatus to another apparatus. In this case, a user needs to reproduce data recorded on the optical disc, and search for the preceding stop point.

In an optical disc apparatus which reproduce data on a recordable and reproducible optical disc such as an MD (mini disc), an apparatus shown in a gazette of Japanese Patent Laid-open Publication HEI 11-297052 can restart next reproduction from the preceding stop point, when once a user takes out the optical disc from the apparatus, and loads the apparatus with the same optical disc again, or when a user transfers the optical disc from one apparatus to another apparatus. This apparatus makes it possible to restart next reproduction from the preceding stop point, by restarting next reproduction from the stop point recorded on the optical disc when it stopped reproducing most recently.

A gazette of Japanese Patent Laid-open Publication HEI 11-110957 discloses such an on-line CD-ROM changer system that each recipient outputs voice which a sender reproduces. In this CD-ROM changer system, a sender records the number of a disc used for reproduction before each recipient is shut off, and after each recipient has been turned on again, a sender reproduces voice recorded on the same optical disc that a sender used for reproduction before each recipient was shut off, using the above disc number.

The prior art shown in the gazette of Japanese Patent Laid-open Publication Laid-open HEI 11-297052 is applicable to the optical disc apparatus for a rewritable optical disc such as an MD and DVD-RAM (digital versatile disc random access memory). But this prior art is not applicable to the optical disc apparatus for a read-only optical disc such as a DVD-ROM(digital versatile disc read only memory) and a CD-ROM(compact disc read only memory), because this prior art requires the optical disc apparatus to record the preceding stop point on the optical disc.

Even if the invention of an on-line CD-ROM changer system shown in the gazette of Japanese Patent Laid-open Publication HEI 11-110957 is applied to a stand-alone optical disc apparatus which reads and reproduces a data alone, the apparatus cannot restart next reproduction from the preceding stop point, when once a user takes out the optical disc from the apparatus, and loads the apparatus with the same optical disc again, or when a user transfers the optical disc from one apparatus to another apparatus.

SUMMARY OF THE INVENTION

An object of the present invention is to provide an optical disc apparatus which can restart next reproduction from the preceding stop point, even when once a user takes out an optical disc from the optical disc apparatus, and loads the optical disc apparatus with the same optical disc again, or even when a user transfers the optical disc from one optical disc apparatus to another optical disc apparatus, whether or not the optical disc is rewritable.

An optical disc apparatus in accordance with an aspect of the present invention comprises: an optical pickup for reading out video image data recorded on the optical disc and outputting the video image data in the form of signals; a decoder for decoding the video image data output by the optical pickup; an input device having an operation key to give the optical disc apparatus an instruction to stop reproducing video images; a non-volatile memory for storing a restart point equivalent to a stop point where the preceding reproduction was stopped using the operation key; and a main controller for reading out the restart point from the non-volatile memory and controlling the optical disc apparatus so as to start reproducing video images from the restart point in starting reproduction processing.

The optical disc apparatus can be connected to a network system which consists of a plurality of optical disc apparatus connected each other.

The optical disc apparatus further comprises an interface circuity for communicating with other optical disc apparatus connected to the network system.

The input device has a referred memory choice key for designating a non-volatile memory to store the reatart point.

When the non-volatile memory designated by the referred memory choice key is its own non-volatile memory, the main controller makes its own non-volatile memory store the restart point, and in starting the reproduction processing, the main controller reads out the restart point from its own non-volatile memory and starts reproducing video images from the restart point.

When the non-volatile memory designated by the referred memory choice key is a non-volatile memory of another optical disc apparatus, the main controller makes the designated non-volatile memory store the restart point using the interface circuity, and in starting the reproduction processing, the main controller reads out the restart point from the designated non-volatile memory using the interface circuity and starts reproducing video images from the restart point.

By such the configuration, the main controller makes the designated non-volatile memory store the restart point equivalent to the preceding stop point, and starts reproducing video images from the restart point. Thus, the main controller can restart next reproduction from the preceding stop point by referring to the above-mentioned restart point, even when once a user takes out the optical disc from the apparatus, and loads the apparatus with the same optical disc again, or even when a user transfers the optical disc from one apparatus to another apparatus, whether or not the optical disc is rewritable.

BRIEF DESCRIPTION OF THE DRAWINGS

FIG. 3 shows a memory reference method choice menu;

FIG. 4 shows a referred player choice menu;

FIG. 9 shows a restart point choice menu using restart time points;

FIG. 10 shows a restart point choice menu using thumbnail images as the restart points;

DETAILED DESCRIPTION OF THE EMBODIMENT

Figure 1:
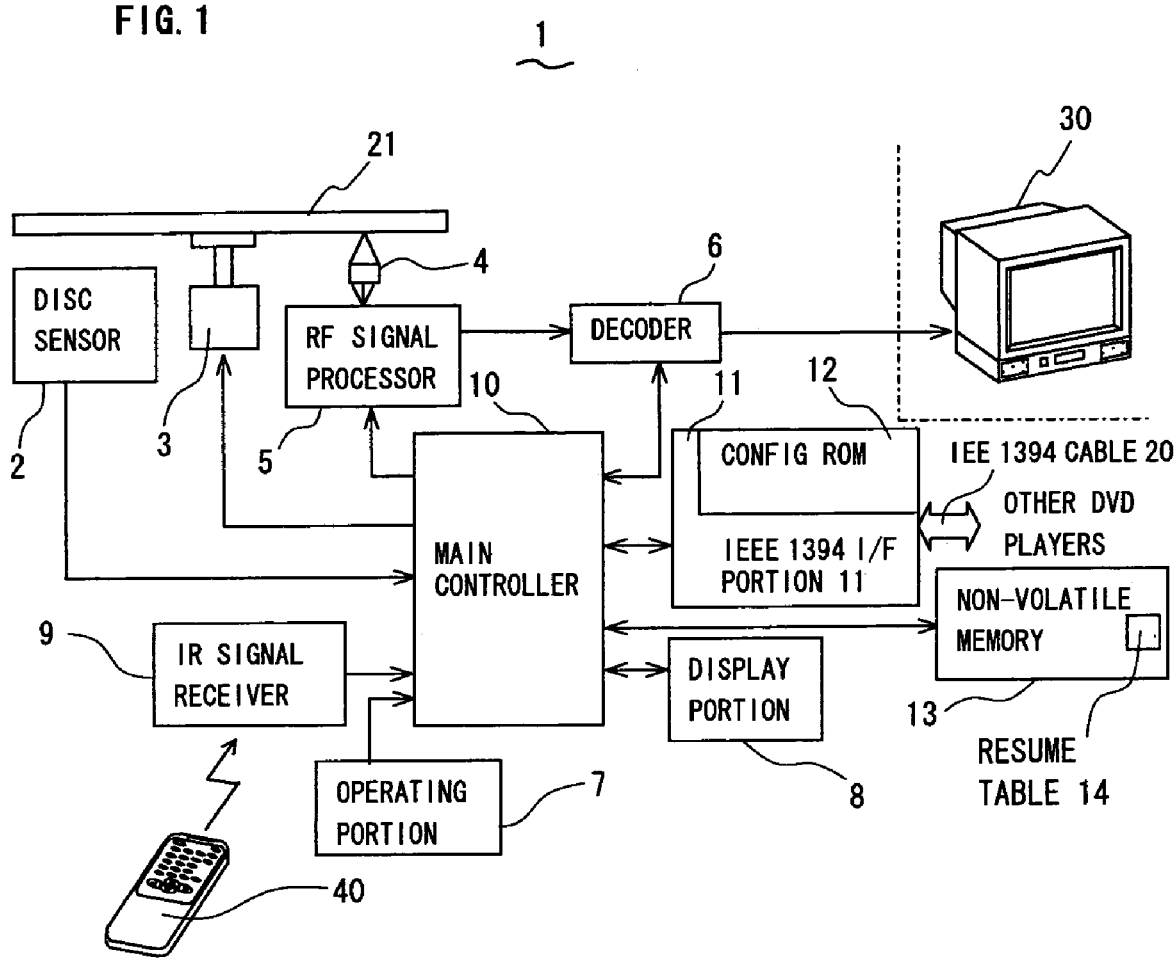
FIG. 1 is a block diagram showing a constitution of an optical disc apparatus in accordance with an embodiment of the present invention.

An embodiment of an optical disc apparatus in accordance with the present invention is described. FIG. 1 is a block diagram showing a configuration of a DVD player (the optical disc apparatus) in the embodiment. The DVD player 1 reads out video image data from a DVD 21, reproduces the video images, and displays the video images on the screen of a monitor display apparatus 30. The DVD player 1 has a resume function. The resume function refers to a function which restarts reproducing video images continuously from the preceding stop point. The DVD 21 which is loaded into the DVD player 1 and used for reproducing the video images is not only a rewritable optical disc such as a DVD-R (digital versatile disc recordable), DVD-RW (digital versatile disc rewritable), DVD-RAM (digital versatile disc random access memory), but also a read only optical disc such as a DVD-ROM (digital versatile disc read only memory).

The DVD player 1 comprises a disc sensor 2, a spindle motor 3, an optical pickup 4, an RF signal processor 5, and a decoder 6. The disc sensor 2 senses whether the DVD 21 is loaded into the DVD player 1 or not. The spindle motor 3 rotates the DVD 21 loaded on a tray 51 (see FIG. 2). The optical pickup 4 reads data recorded on the DVD 21 and outputs the data in the form of RF signals. The RF signal processor 5 does a process such as a digitization process of the RF signals. The decoder 6 does a decode process of the data digitized by the RF signal processor 5. This decode process involves a demodulation process and an error-correction process.

The DVD player 1 further comprises a main controller 10 and a remote controller 40. The main controller 10 controls various circuits in the;DVD player 1. The remote controller 40 transmits infrared ray signals to give various instructions and configuration to the main controller 10. Not only the above disc sensor 2, the spindle motor 3, the RF signal processor 5, and the decoder 6, but also an operating portion 7, a display portion 8, and an IR (infrared ray) signal receiver 9 are connected to the main controller 10. The operating portion 7 has a plurality of operation keys which is operated by a user for giving various instructions and configuration to the main controller 10. The display portion 8 displays various messages. The IR signal receiver 9 receives the infrared ray signals from the remote controller 40, and outputs operation signals corresponding to the infrared ray signals to the main controller 10.

Additionally, an IEEE1394 I/F portion 11 and a non-volatile memory 13 are connected to the main controller 10. The IEEE1394 I/F portion 11 transfers various data via an IEEE1394 cable 20. The non-volatile memory 13 stores various data including initial setting data. The IEEE1394 I/F portion 11 contains a Config ROM 12 which stores the GUID (globally unique identification) and the performance information of the DVD player 1. The GUID generally refers to an identification which is unique to each of apparatus connected to IEEE1394 networks. This identification is given to each of the apparatus when each of the apparatus has been manufactured. The GUID given to each of the apparatus is globally unique.

A resume table 14 in the non-volatile memory 13 stores restart points corresponding to the DVDs 21 which have been loaded into DVD players connected to the IEEE1394 network containing the DVD player 1. Data stored in the non-volatile memory 13 including data in the resume table 14 is not purged, even when the DVD player 1 is turned off to be in the standby state, or even when once the DVD 21 is taken out from the DVD player 1.

Figure 2:
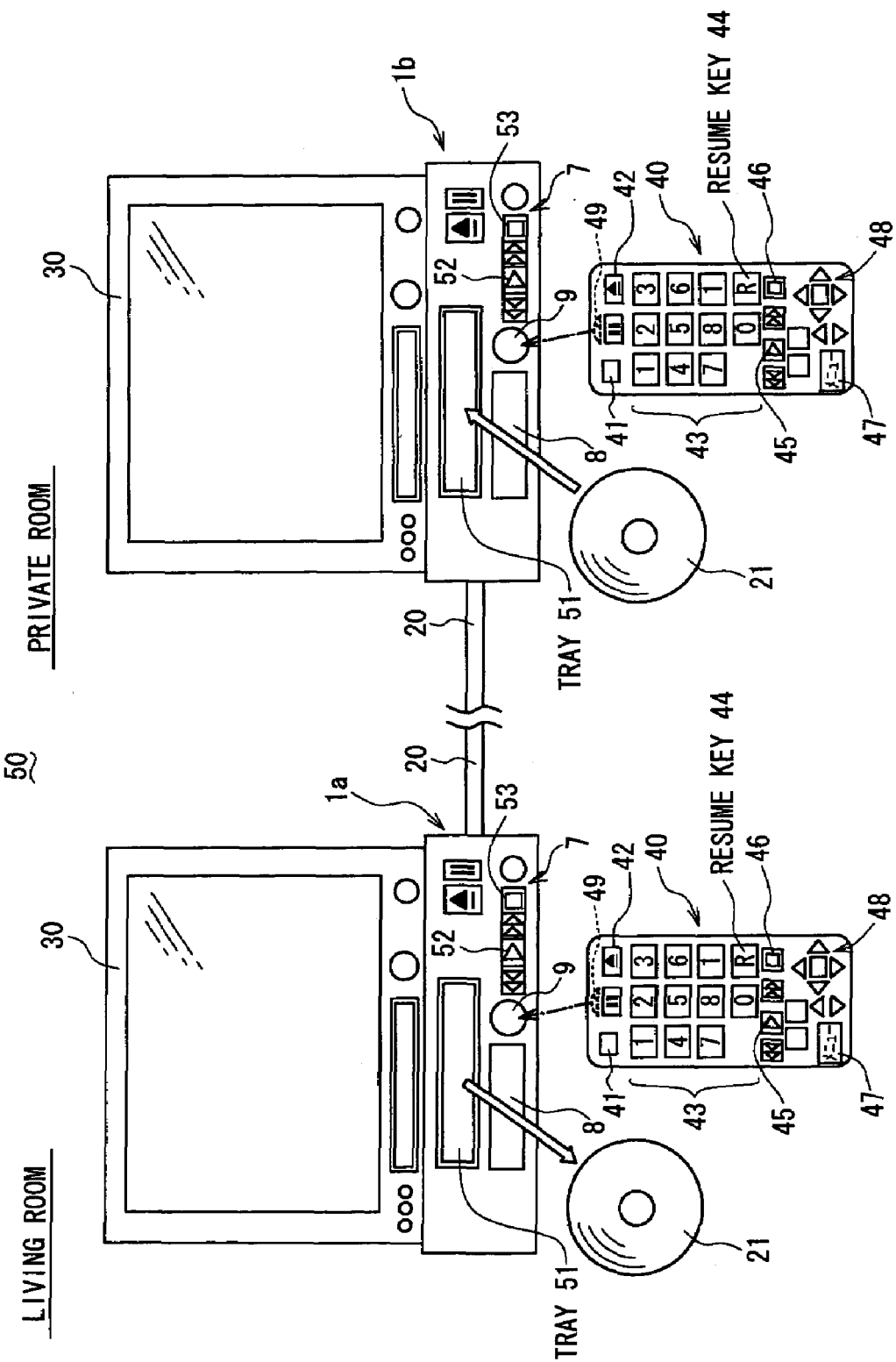
FIG. 2 shows a network system which consists of such DVD players connected each other.

FIG. 2 shows a network system 50 which consists of the plural DVD players connected each other. In the network system 50, the DVD player 1a in the living room and the DVD player 1b in the private room are connected each other. The DVD player 1a and the DVD player 1b communicate via IEEE1394 protocols. Each of the DVD player 1a and the DVD player 1b is provided with the above operating portion 7, the display portion 8, the IR signal receiver 9, and a tray 51 on which the DVD 21 is load on the front face. The operating portion 7 in each of the DVD player 1a, 1b has a reproduction key 52 and a stop key 53.

The remote controller 40 in each of the DVD player 1a, 1b has a power key 41, an eject key 42, a numerical character input key 43, a resume key 44, a reproduction key 45 and a stop key 46, a menu key 47, a choice key 48, and an IR signal sender 49. The power key 41 is used for turning on and off the DVD player 1a, 1b. The eject key 42 is used for instructing to open and close the tray 51. The resume key 44 is used for enabling and disabling a resume function. The menu key 47 is used for instructing to display various configuration menus. The choice key 48 is used for selecting various modes and a restart point. The IR signal sender 49 sends the infrared ray signals.

The choice processing of the memory reference method and the choice processing of the referred DVD player are desclibed referring to FIG. 3 and FIG. 4. This choice processing is done by a user when the resume function is enabled. When a user turns on the DVD player 1 and the monitor display apparatus 30, and presses the menu key 47 of the remote controller 40, the main controller 10 displays a memory reference method choice menu 61 shown in FIG. 3 on the screen of the monitor display apparatus 30, and prompts a user to choose the memory reference method used when the resume function is enabled.

When a user chooses "1. UNCONDITIONAL REFERENCE TO DESIGNATED MEMORY" using the choice key 48 of the remote controller 40, the main controller 10 displays a referred player choice menu 62 shown in FIG. 4 on the screen of the monitor display apparatus 30, and prompts a user to designate the DVD player whose non-volatile memory is referred. When a user designates the DVD player, the main controller 10 configures the DVD player to store a stop point (the time point and the address point where the reproduction of video images has been stopped) as a restart point in the resume table 14 of the designated DVD player when the reproduction of video images was stopped, and to refer to the restart point stored in the resume table 14 of the designated DVD player in starting reproduction processing.

When a user chooses "2. REFERENCE TO THE REPRODUCING PLAYER" using the choice key 48 of the remote controller 40, the main controller 10 configures the DVD player to store the stop point as the restart point in the resume table 14 of the DVD player where the DVD 21 is loaded when the reproduction of video images was stopped, and to refer to the restart point stored in the resume table 14 of the DVD player where the DVD 21 is loaded in starting the reproduction processing.

When a user chooses "3. CHOOSING BETWEEN 1 AND 2 EACH TIME" using the choice key 48 of the remote controller 40, the main controller 10 configures the DVD player to display the memory reference method choice menu 61 on the screen of the monitor display apparatus 30 as often as a user presses the resume key 44 of the remote controller 40. Subsequently, the main controller 10 performs the processing similar to the above-mentioned processing according to which menu option a user chooses from the memory reference method choice menu 61 and the referred player choice menu 62.

Figures 5, 6:
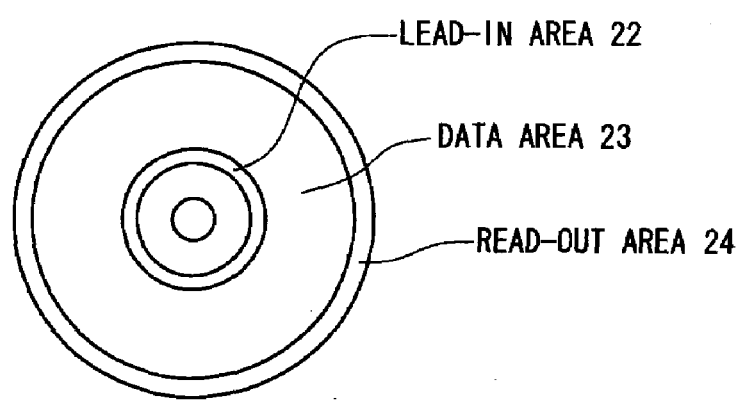
FIG. 5 shows contents of a resume table.
FIG. 6 shows a format of recording area about a DVD.

FIG. 5 shows the contents of the resume table 14 for situations where the DVD player 1a, 1b shown in FIG. 2 were configured to refer to the resume table 14 of the same DVD player. This resume table 14 is loaded with resume information 71 about the DVDs 21 that have been reproduced by the DVD player 1a or the DVD player 1b. Each of the resume information 71 consists of the IDs (identifications) 72 and the restart points 73 about the DVDs 21. The ID 72 is an identification which is unique to each of the DVDs 21. This ID 72 is a piece of the DVD management information recorded on the lead-in area 22 (see FIG. 6) of the DVD 21. The restart point 73 consists of the restart time point 74 and the restart address point 75. These point 74, 75 are the time point and the address point where the preceding reproduction of the video images recorded on the DVD 21 has been stopped.

As mentioned above, when each of the DVD players 1 in the network system 50 is configured to refer to the resume table 14 of the same DVD player 1, the resume information 71 about the DVDs 21 that have been reproduced by any of the DVD players 1 in the network system 50 is stored in the common resume table 14. Thus, even when a user transfers the DVD 21 used for halfway reproduction in one DVD player 1 to another DVD player 1, the latter DVD player 1 can restart next reproduction from the preceding stop point based on the restart point 73 of the corresponding DVD 21 stored in the common resume table 14. Consequently, for example, even when a user transfers the DVD 21 used for halfway reproduction in the DVD player 1a in the living room (see FIG. 2) to the DVD player 1b in the private room, a user can make the DVD player 1b in the private room restart reproducing video images from the point where a user stopped reproducing video images in the DVD player 1a in the living room.

Whichever memory reference method was chosen in the memory reference method choice menu 61, the main controller 10 stores a stop point (the time point and the address point where the reproduction of video images has been stopped) as a restart point 73 in the resume table 14 of any of the DVD players 1 in the network system 50. This restart point 73 is stored in the resume table 14, related to the ID 72 of the DVD 21 which was used for reproducing. Thus, the DVD player 1 can maintain the restart point 73 related to the ID 72 of the DVD 21, even if once a user takes out the DVD 21 used for halfway reproduction from the DVD player 1. Consequently, the DVD player 1 can restart next reproduction from the restart point 73 equivalent to the stop point where the preceding reproduction of video images recorded on the DVD 21 was stopped, when this DVD 21 is loaded into the same DVD player 1 again.

Refering to FIG. 6, there is shown therein the format of the recording area about the DVD 21. A lead-in area 22 to record management information is provided on the inner side of the DVD 21. A data area 23 to record user information such as image data is provided outside the lead-in area 22. A lead-out area 24 to record a lead-out signal which informs the DVD player 1 of the end of the recording area is provided outside the data area 23. The DVD management information recorded on the lead-in area 22 includes the identification which is unique to this DVD 21.

Subsequently, the general operation of the DVD player 1 is described with reference to the flowchart illustrated in FIG. 7. When the DVD player 1 is turned on, the main controller 10 judges whether the DVD 21 is loaded on the tray 51 or not corresponding to the sensing signal from the disc sensor 2 (S1). When the main controller 10 judges that the DVD 21 is loaded (YES in step S1), the main controller 10 judges whether either the reproduction key 45 of the remote controller 40 or the reproduction key 52 of the operating portion 7 has been pressed or not (S2). When the main controller 10 judges, that either the key 45 or the key 52 has been pressed (YES in step S2), the main controller 10 performs reproduction start processing to be described later (S3), and keeps on reproducing the data recorded on the DVD 21, until either the stop key 46 of the remote controller 40 or the stop key 53 of the operating portion 7 has been pressed (S4 and S5).

When either the key 46 or the key 53 has been pressed (YES in step S5), the main controller 10 writes the reproducing point at that time as the restart point 73 to the resume table 14 in the DVD player 1 whose non-volatile memory 13 is configured to be refered to using the memory reference method choice menu 61 and the referred player choice menu 62 (S6).

Figure 7:
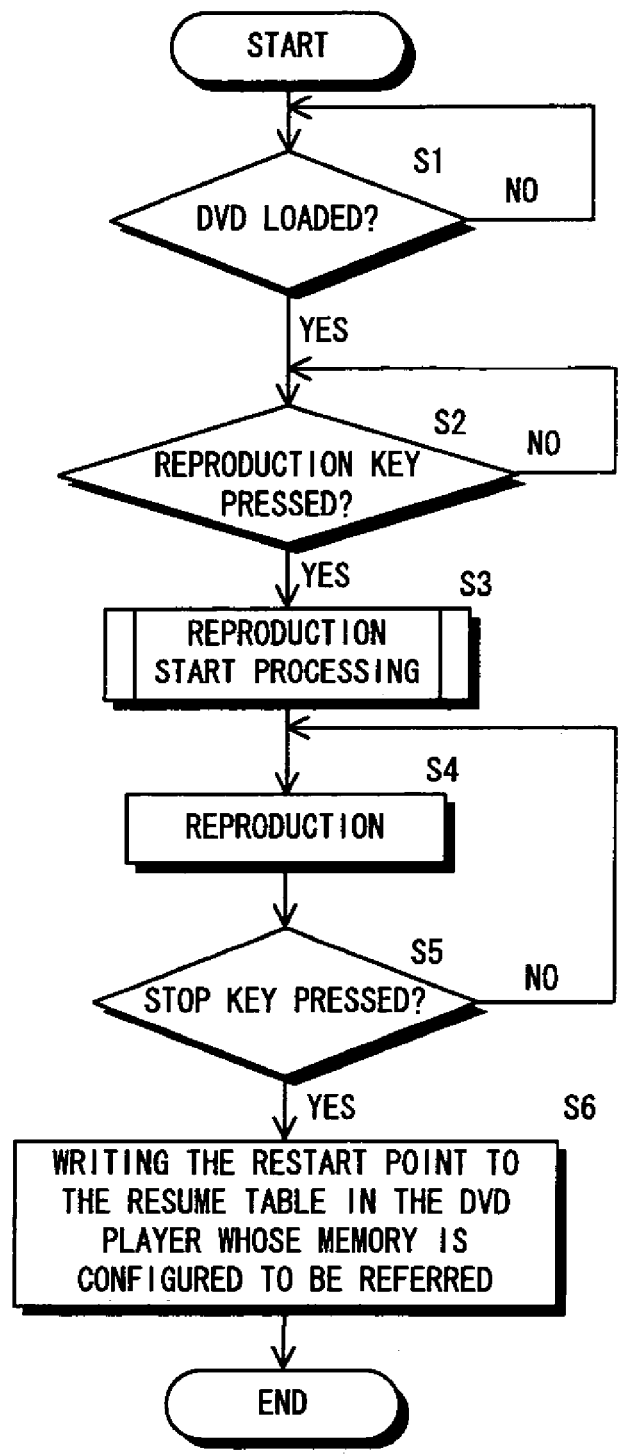
FIG. 7 shows a flowchart of a general operation of the DVD player.
Figure 8:
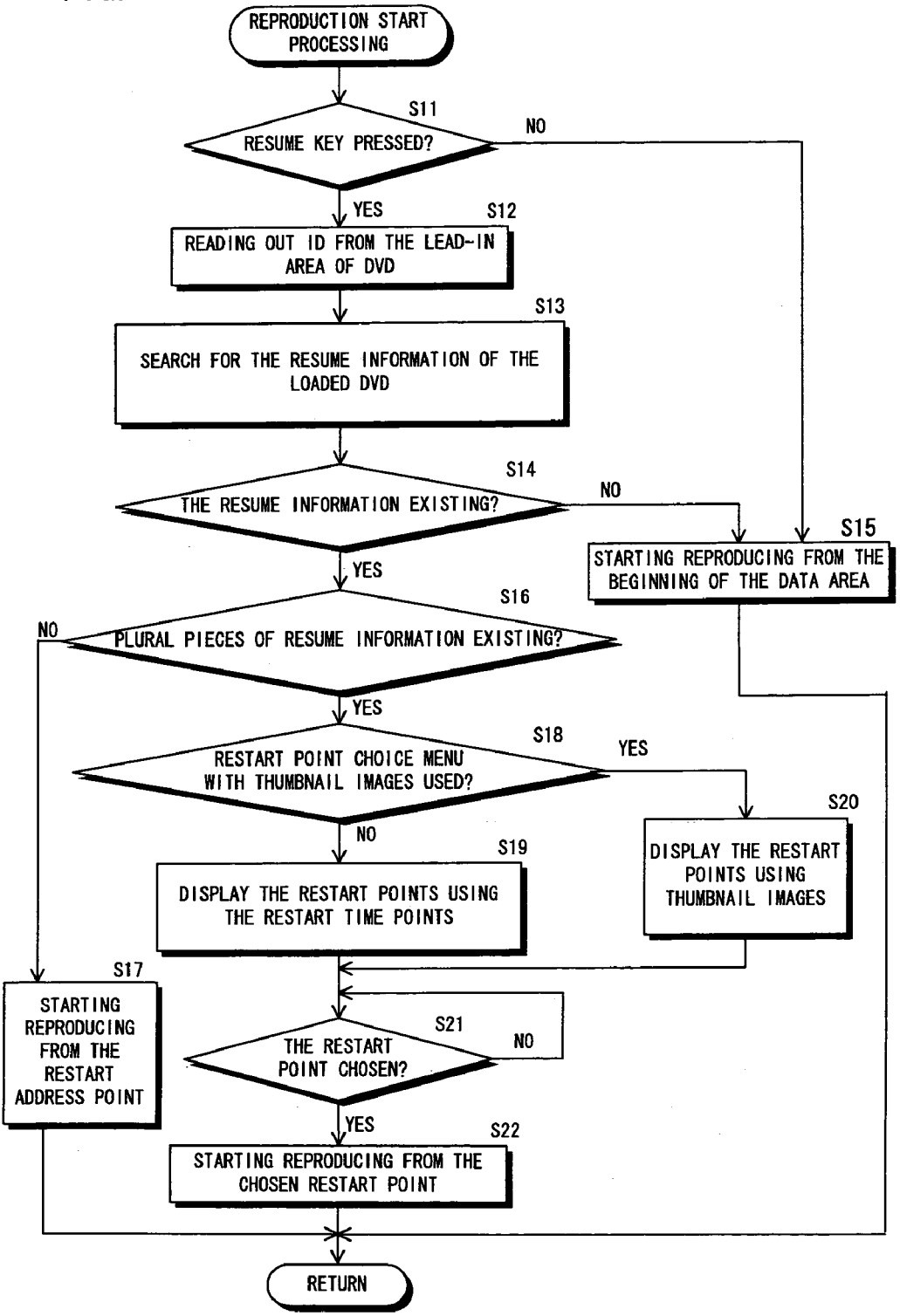
FIG. 8 shows a flowchart of a reproduction start processing shown in the step S3 of FIG. 7.

Subsequently, the reproduction start processing shown in the step S3 of FIG. 7 is described with reference to the flowchart shown in FIG. 8. When the resume key 44 of the remote controller 40 is not pressed after the DVD player 1 was turned on (NO in step S11), the main controller 10 configures the resume function to be disabled, and starts reproducing video images from the beginning of the data area 23 shown in FIG. 6 (S15).

Alternatively, when the resume key 44 of the remote controller 40 is pressed (YES in step S11), the main controller 10 configures the resume function to be enabled, and reads out the identification from the lead-in area 22 (see FIG. 6) of the loaded DVD 21 using the optical pickup 4. Subsequently, the main controller 10 reads the resume table 14 of the DVD player 1 whose non-volatile memory 13 is configured to be refered, and searches for the resume information 71 including the ID 72 identical to the identification read out using the optical pickup 4 (S13). By this search processing the main controller 10 judges whether the resume information 71 corresponding to the loaded DVD 21 exists in the resume table 14 or not (S14).

As a result of the above judgement, when the main controller 10 judges that the resume information 71 corresponding to the loaded DVD 21 does not exist (NO in step S14), the main controller 10 starts reproducing video images from the beginning of the data area 23 shown in FIG. 6 (S15). Alternatively, when the main controller 10 judges that the resume information 71 corresponding to the loaded DVD 21 exists (YES in step S14), the main controller 10 judges whether plural pieces of resume information 71 corresponding to the loaded DVD 21 exists in the resume table 14 or not (S16). As a result of this judgement, when the main controller 10 judges that only a piece of resume information 71 exists (NO in step S16), the main controller 10 starts reproducing video images from the restart address point 75 (see FIG. 5) in the resume information 71 corresponding to the loaded DVD 21 (S17).

Alternatively, when the main controller 10 judges that plural pieces of resume information 71 corresponding to the loaded DVD 21 exists in the resume table 14 (YES in step S16), the main controller 10 displays a confirmation window (not shown) to confirm if a user uses a restart point choice menu whose each restart point is displayed by a thumbnail image. When a user opts not to use the above restart point choice menu at the confirmation window (NO in step S18), the main controller 10 displays a restart point choice menu 81 (see FIG. 9) using the restart time points 74 as the restart points (S19). Alternatively, when a user opts to use the restart point choice menu whose each restart point is displayed by a thumbnail image at the confirmation window (YES in step S18), the main controller 10 reads out the video images corresponding to the restart address point 75 about the loaded DVD 21 from the data area 23 of the DVD 21 using the optical pickup 4. The main controller 10 converts the video images read out from the data area 23 of the DVD 21 into the thumbnail images, and displays a restart point choice menu 82 (see FIG. 10) using thumbnail images 84 as the restart points on the screen of the monitor display apparatus 30 (S20).

Subsequently, a user chooses the restart point from the restart point choice menu 81 or 82 using the choice key 48 of the remote controller 40 (YES in step S21), the main controller 10 starts reproducing video images from the address corresponding to the chosen restart point (S22).

The above resume information 71 stored in the resume table 14 is cleared by the main controller 10 when all the video images recorded in the data area 23 of the corresponding DVD 21 have been reproduced.

According to the above-mentioned DVD player 1, when a user selects the common DVD player 1 as the DVD player whose non-volatile memory is referred by each of the DVD players 1 in the network system 50 using the choice menu 61 and 62, the main controller 10 configures each of the DVD players 1 to store the resume information 71 about the DVDs 21 whose visual data have been reproduced by any of the DVD players 1 in the network system 50 into the common resume table 14 of the chosen (designated) DVD player 1. Thus, even when a user transfers the DVD 21 used for halfway reproduction in one DVD player 1 to another DVD player 1, the latter DVD player 1 can restart next reproduction from the preceding stop point based on the restart point 73 of the corresponding DVD 21 stored in the common resume table 14.

Additionally, the above DVD player 1 stores the restart point 73 equivalent to the reproducing point where the preceding reproduction of video images was stopped in the resume table 14 of any of the DVD players 1 in the network system 50. Thus, even when once a user takes out the DVD 21 used for halfway reproduction from the DVD player 1, the restart point 73 related to the ID 72 of the DVD 21 was maintained. Consequently, every DVD player 1 in the network system 50 can restart next reproduction of video images from the restart point 73 equivalent to the stop point where the preceding reproduction of video images recorded on the above DVD 21 has been stopped. Moreover, even when a user loads another DVD 21 than the DVD 21 which was loaded into the DVD player 1 most recently, the DVD player 1 can restart next reproduction of video images from the point equivalent to the preceding stop point of the loaded DVD 21 as long as the loaded DVD 21 has been used for reproduction by any of the DVD players 1 in the network system 50.

The present invention is not restricted the above-mentioned embodiment and can be modified in various ways. In this embodiment, the writing processing of the restart point into the resume table is executed, when the stop key has been pressed. The present invention, however, is not restricted the above description, so that it is possible for the main controller to execute the writing processing of the restart point into the resume table even when the main controller is reproducing video images, whenever a point key (not shown) provided on the remote controller or the operating portion is pressed. Thus, when each of users who watched the video images recorded on one DVD together using the same DVD player stopped watching them at a different reproducing point, each of the users can make the main controller write the different reproducing point as the restart point into the resume table by pressing the above point key on the occasion of leaving his seat. Consequently, each of the users can make the same DVD player reproduce the video images recorded on the same DVD from the point where each of the users stopped watching the video images recorded on the DVD previously.

Furthermore, since the clearance of the resume information stored in the resume table is not restricted when all the video images recorded in the data area of the corresponding DVD have been reproduced, it is possible to display the menu for choosing the resume information to be cleared from the resume table on the screen of the monitor display apparatus, and clear the resume information chosen from this menu by a user.

This application is based on Japanese patent application 2002-338152 filed in Japan dated Nov. 21, 2002, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical disc apparatus comprising:
   an optical pickup for reading out video image data recorded on the optical disc and outputting the video image data in the form of signals;
   a decoder for decoding the video image data output by the optical pickup;
   an input device having an operation key to give the optical disc apparatus an instruction to stop reproducing video images;
   a non-volatile memory for storing a restart point equivalent to a stop point where the preceding reproduction was stopped using the operation key; and
   a main controller for reading out the restart point from the non-volatile memory and controlling the optical disc apparatus so as to start reproducing video images from the restart point in starting reproduction processing; wherein
   the optical disc apparatus can be connected to a network system which consists of a plurality of optical disc apparatus connected each other;
   the optical disc apparatus further comprises an interface circuity for communicating with other optical disc apparatus connected to the network system;

the input device has a referred memory choice key for designating a non-volatile memory to store the restart point;

when the non-volatile memory designated by the referred memory choice key is its own non-volatile memory, the main controller makes its own non-volatile memory store the restart point, and in starting the reproduction processing, the main controller reads out the restart point from its own non-volatile memory and starts reproducing video images from the restart point; and when the non-volatile memory designated by the referred memory choice key is a non-volatile memory of another optical disc apparatus, the main controller makes the designated memory store the restart point using the interface circuity, and in starting the reproduction processing, the main controller reads out the restart point from the designated memory using the interface circuity and starts reproducing video images from the restart point.

2. The optical disc apparatus in accordance with claim 1, wherein
the main controller makes the non-volatile memory designated by the referred memory choice key store the restart point related to the ID of the optical disc which was read out by the optical pickup, and in starting the reproduction processing, the main controller reads out the restart point related to the ID of the loaded optical disc from the designated memory and starts reproducing video images from the restart point.

3. The optical disc apparatus in accordance with claim 1, wherein
the input device further has a memory reference method choice key for choosing between a memory reference method that its own non-volatile memory is referred to and a memory reference method that the designated non-volatile memory is referred to; and
when the memory reference method that the designated non-volatile memory is referred to is chosen using the memory reference method choice key, the main controller enables a user to designate a non-volatile memory to store the reatart point using the referred memory choice key.

4. The optical disc apparatus in accordance with claim 2, wherein
the input device further has a memory reference method choice key for choosing between a memory reference method that its own non-volatile memory is referred to and a memory reference method that the designated non-volatile memory is referred to; and
when the memory reference method that the designated non-volatile memory is referred to is chosen using the memory reference method choice key, the main controller enables a user to designate a non-volatile memory to store the reatart point using the referred memory choice key.

5. The optical disc apparatus in accordance with claim 2, further comprising a display device and wherein
the input device further has a restart point choice key for choosing the restart point of the optical disc; and
the main controller makes the non-volatile memory designated by the referred memory choice key store one or more restart points related to the ID of each optical disc, and in starting the reproduction processing, the main controller reads out one or more restart points related to the ID of the loaded optical disc from the designated non-volatile memory, displays a list of the restart points read out from the designated non-volatile memory on the display device, and starts reproducing video images from the restart point chosen among the restart points displayed on the display device by the restart point choice key.

6. The optical disc apparatus in accordance with claim 5, wherein
the main controller makes the designated non-volatile memory store one or more restart points shown in thumbnail images which were related to the ID of each optical disc, and in starting the reproduction processing, the main controller displays a choice menu of the restart points shown in the thumbnail images on the display device.

7. The optical disc apparatus in accordance with claim 6, wherein
the input device further has a menu type choice key for choosing between a choice menu of the restart points shown in the thumbnail images and a choice menu of the restart points shown in time points; and
in starting the reproduction processing, the main controller displays the choice menu chosen by the menu type choice key on the display device.

* * * * *